(12) United States Patent
Tale et al.

(10) Patent No.: US 12,059,866 B2
(45) Date of Patent: Aug. 13, 2024

(54) APPARATUS AND METHOD FOR BENDING TUBULAR PRODUCTS

(71) Applicant: I.M.A. INDUSTRIA MACCHINE AUTOMATICHE S.P.A., Ozzano dell'Emila (IT)

(72) Inventors: Fabrizio Tale, Ozzano dell'Emilia (IT); Fiorenzo Draghetti, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 1 day.

(21) Appl. No.: 18/009,392

(22) PCT Filed: Jun. 8, 2021

(86) PCT No.: PCT/IT2021/050175
§ 371 (c)(1),
(2) Date: Dec. 9, 2022

(87) PCT Pub. No.: WO2021/250711
PCT Pub. Date: Dec. 16, 2021

(65) Prior Publication Data
US 2023/0226794 A1  Jul. 20, 2023

(30) Foreign Application Priority Data
Jun. 10, 2020  (IT) .......................... 102020000013828

(51) Int. Cl.
B31D 5/00 (2017.01)
(52) U.S. Cl.
CPC .................. B31D 5/0095 (2013.01)

(58) Field of Classification Search
CPC ...... B29C 53/083; B31D 5/0095; B31D 5/00; B31F 1/205; B31F 1/20
USPC ........................................................ 493/465
See application file for complete search history.

(56) References Cited

U.S. PATENT DOCUMENTS

| 3,493,998 A | * | 2/1970 | Mueller ................. | B29C 53/30 425/391 |
| 5,697,786 A | * | 12/1997 | Lange-Mickel ........ | B31F 1/205 433/96 |
| 6,346,211 B1 | * | 2/2002 | Rafferty ................. | B29C 53/083 264/339 |
| 2009/0283608 A1 | * | 11/2009 | Crawley .................. | B29C 49/00 220/8 |

FOREIGN PATENT DOCUMENTS

CN  2403682 Y  11/2000

OTHER PUBLICATIONS

International Search Report and Written Opinion for PCT Patent Application No. PCT/IT2021/050175 dated Sep. 13, 2021, 12 pages.

* cited by examiner

*Primary Examiner* — Jacob A Smith
(74) *Attorney, Agent, or Firm* — MCANDREWS HELD & MALLOY, LTD

(57) ABSTRACT

Apparatus (10) for bending tubular products (100) wherein each tubular product (100) is provided with a flexible portion (111) configured to allow a bending of the tubular product (100). The tubular products (100) are disposed, at least temporarily, on positioning means (19), while bending means (18) each allow the bending of a respective tubular product (100) in correspondence with the flexible portion (111).

19 Claims, 4 Drawing Sheets

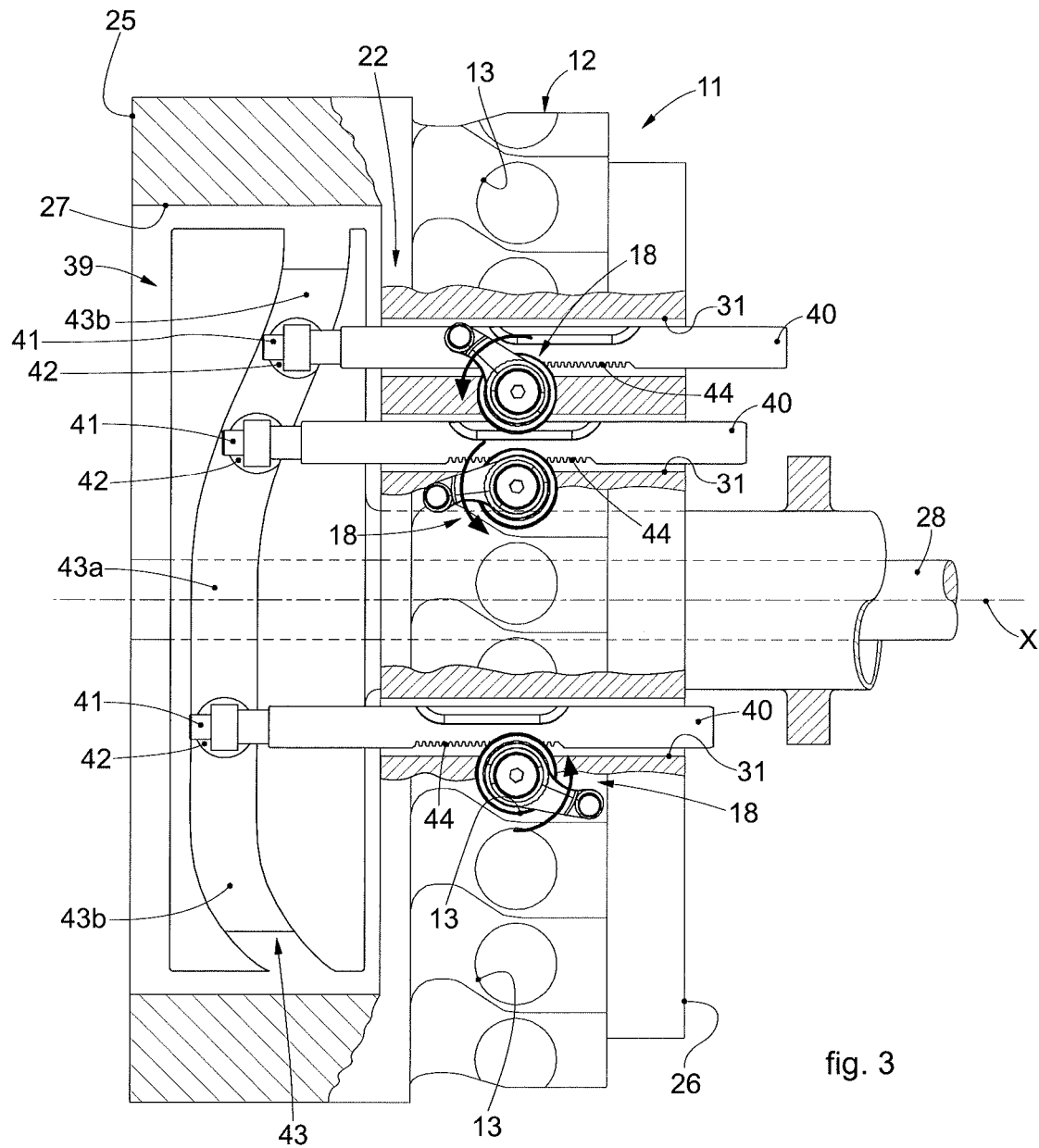
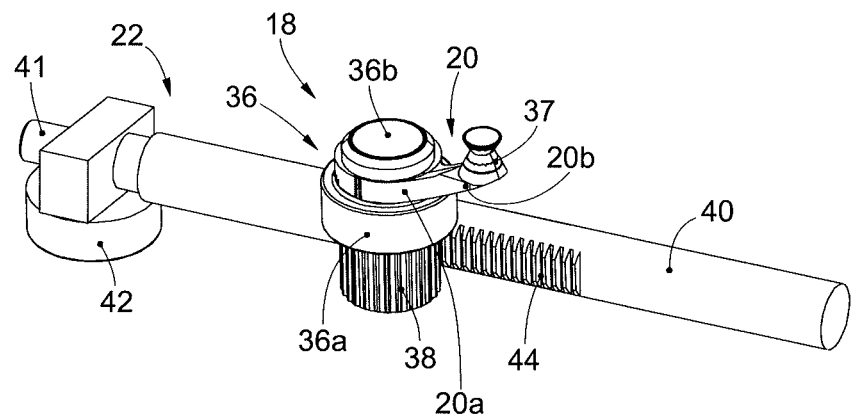
fig. 3
fig. 3a

APPARATUS AND METHOD FOR BENDING TUBULAR PRODUCTS

CROSS-REFERENCE TO RELATED APPLICATIONS

The present application is a National Phase Entry of PCT International Application No. PCT/IT2021/050175, which was filed on Jun. 8, 2021, which claims priority to Italian patent application No. 102020000013828, filed Jun. 10, 2020, both of which are hereby incorporated by reference in their entireties.

FIELD OF THE INVENTION

The present invention concerns an apparatus and the corresponding method for bending tubular products, preferably straws, even more preferably straws made of paper, cardboard or other similar materials, to be used to drink a liquid or semi-liquid. Usually, these containers are small in size and are provided with a pierceable zone.

Specifically, the apparatus and the method according to the present invention are able to bend each straw into two parts, to reduce its length before it is packaged, and then to allow a user to bend it at will, also in a repeatable manner, without damaging it and maintaining its functionality.

BACKGROUND OF THE INVENTION

The use of drinking straws dates back to thousands of years ago, although their diffusion has become massive since the last century, thanks to the use of straw and the industrialization of production.

Before the advent and the enormous use of plastic materials, with which drinking straws are still produced, there was a period in which straws were produced with paper, although production with the latter material created problems of cost, consistency, rigidity, creasing, or collapse of the straws.

In order to try to reduce environmental pollution, many countries have the target of limiting, if not eliminating, where possible, the use of plastic materials, and therefore there is currently a strong need to return to producing straws, including drinking straws, using paper as a raw material.

A particular sector of drinking straws is that of small straws to be associated individually with the containers of beverages, such as fruit juices, or other, hermetically sealed, also known by the term "Brik", which are normally small in size, with a capacity in the range of 100-200 ml, each provided with a pierceable zone to facilitate the insertion of the straw.

Each of these straws is normally provided with a pointed end, for example with an oblique cut with respect to its longitudinal axis, to facilitate the insertion thereof into the pierceable zone of the closed container.

These particular straws are normally provided with a flexible zone, for example of the bellows type, which allows the straw itself to be bent in two, even in a repeatable manner, without damaging it. Examples of such straws are described in the international patent application WO 2020/178873 filed by the present Applicant.

Moreover, for hygiene and food safety, each of these drinking straws is normally inserted into its own sealed casing.

Machines and methods are already known for the automated production of tubular products using paper as a raw material, from which drinking straws are made.

Known machines and corresponding methods to produce the particular paper drinking straws, which are also provided with a flexible zone, however, all have the disadvantage of being very expensive and bulky, so much so that they are sometimes a few dozen meters long, because they carry out the various processing steps separately; they also have the disadvantage of having a relatively low hourly production capacity, so that the single piece produced is quite expensive.

In particular, one of the most critical operations during the production of straws is the one that concerns the bending of the end part of the straws, because paper is a very deformable material, and there is a high risk of irreversibly damaging the tubular bodies of the straws. In fact, an excessive bending could make the straw useless, for example by obstructing its internal passage channel, whereas a not very accentuated bending could make the straw very bulky and therefore difficult to package.

Currently, known apparatuses for bending straws provide a substantially in line disposition of the components, and the straws are made to advance linearly, for example on a belt. During the forward movement, a contrast pin intercepts the straws in correspondence with a flexible portion thereof and causes the straws to bend in cooperation with the action of opposite fixed contrast elements acting on the two end portions of the straws to be bent.

One example of a known apparatus for bending straws made of thermoplastic material is described in U.S. Pat. No. 6,346,211 B1.

There is therefore a need to perfect an apparatus for bending tubular products that can overcome the disadvantages of the state of the art.

One purpose of the present invention is to provide an apparatus for bending tubular products, preferably straws, even more preferably paper straws, which is able to bend the end part of the tubular product quickly and accurately, and at the same time without damaging it.

Another purpose of the present invention is to provide an apparatus for bending tubular products which allows high productivity, understood as the number of tubular products bent in a unit of time, for example over 1,000 per minute.

Another purpose of the present invention is to provide an apparatus for bending tubular products which is particularly compact, simple to make and inexpensive.

It is also a purpose of the present invention to perfect a method to bend tubular products that is rapid, repeatable and allows high productivity.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, some embodiments concern an apparatus for bending tubular products, preferably straws, even more preferably paper straws.

The apparatus for bending tubular products can be suitable to be inserted into a machine, or line, for the automated production of straws.

In the present description, the apparatus and the method according to the present invention will be described with reference to the bending of a tubular product configured as a straw, to which we will refer hereafter by way of a non-limiting example.

It is understood that the teachings of the present invention disclose an apparatus and a method suitable to also bend other types of tubular products, even different from straws, for the working of which the person of skill in the art will be perfectly capable of adapting the teachings of the present invention, according to the specific application.

Each tubular product can, therefore, be configured as a straw having a flexible portion configured to allow a bending of two terminal portions of the straw, one over the other.

The apparatus comprises:
at least one support member configured to support, at least temporarily, one or more of the tubular products;
positioning means, associated with the support member to keep each of said tubular products at least temporarily in a determinate position with respect to the support member;
bending means, also associated with the support member and cooperating with the positioning means to carry out at least one bending of the tubular products, preferably in correspondence with the flexible portion.

This solution allows to limit the overall sizes of the bending apparatus and at the same time to increase its hourly productivity. Furthermore, the conformation of the support means allows to carry out a very precise bending without damaging the body of the tubular product.

In accordance with some embodiments, there is provided a method to bend tubular products, preferably straws, even more preferably paper straws, carried out with the apparatus for bending tubular products in accordance with the present invention. The method provides that the following steps are carried out, preferably continuously:
a supply step, in which the positioning means, associated with the support member, rotating around its axis of rotation, receive and at least temporarily hold one or more tubular elements in a determinate position with respect to the support member,
a bending step, in which the bending means each carry out at least one bending of a respective tubular product, preferably in correspondence with said flexible portion,
a delivery step, in which the already bent tubular elements are released from the positioning means in order to be delivered outside the support member.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 3 is a schematic view showing the functioning of the drive members which actuate the bending means;

FIG. 3a is a perspective view of some enlarged components of FIG. 3;

To facilitate comprehension, the same reference numbers have been used, where possible, to identify identical common elements in the drawings. It is understood that elements and characteristics of one embodiment can conveniently be incorporated into other embodiments without further clarifications.

Figure 1:
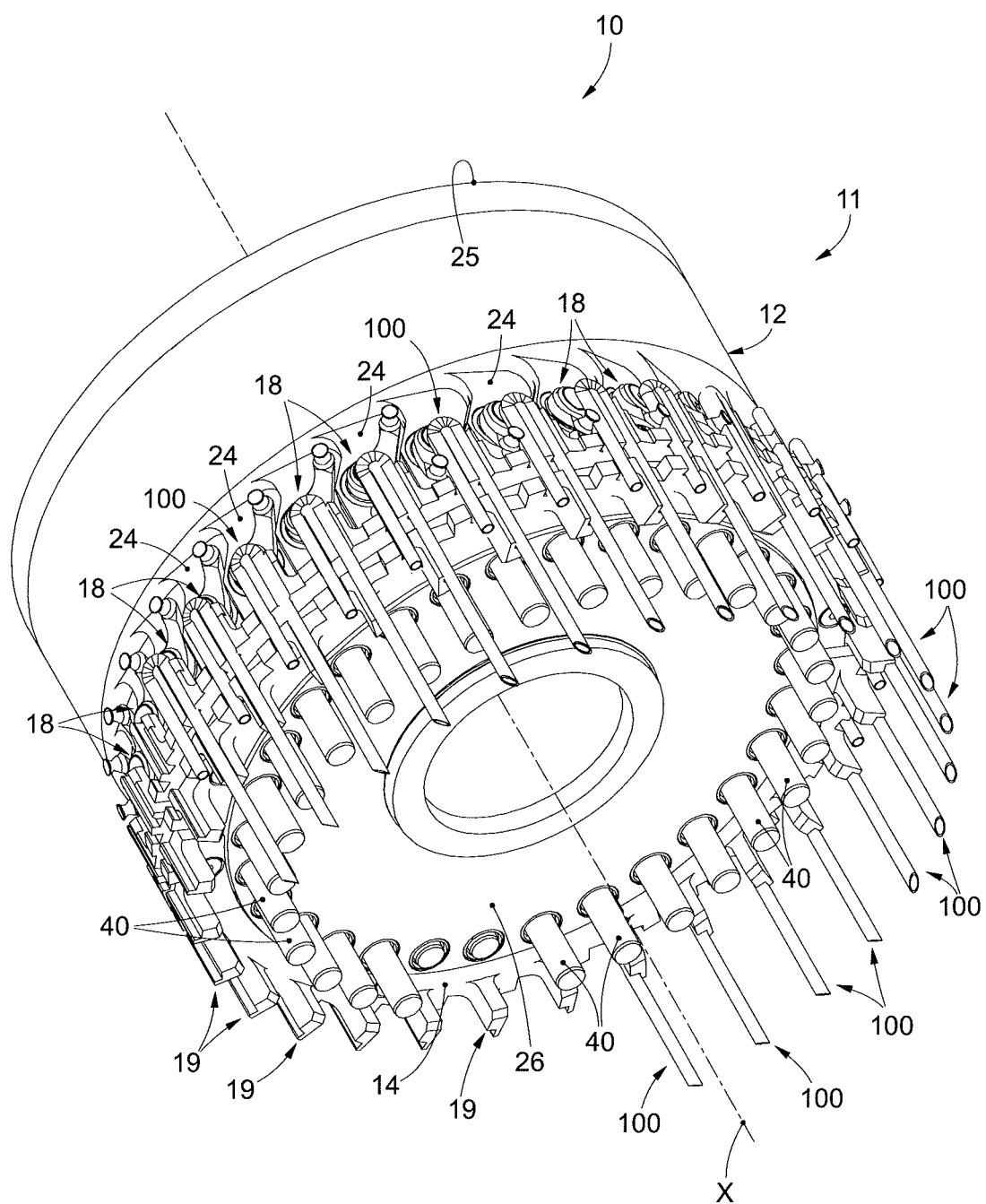
FIG. 1 is a perspective view of an apparatus for bending tubular products, configured here as straws, preferably paper straws, in accordance with some embodiments described here.

We must clarify that in the present description and in the claims the terms vertical, horizontal, lower, upper, right, left, high, low, front, rear, with their declinations, have the sole function of better illustrating the present invention with reference to the drawings and must not be in any way used to limit the scope of the invention itself, or the field of protection defined by the claims. For example, by the term horizontal we mean an axis, or a plane, that can be either parallel to the line of the horizon, or inclined, even by several degrees, for example up to 20°, with respect to such perpendicular position.

Furthermore, the person of skill in the art will recognize that certain sizes or characteristics in the drawings may have been enlarged, deformed, or shown in an unconventional or non-proportional manner in order to provide a version of the present invention that is easier to understand. When sizes and/or values are specified in the following description, such sizes and/or values are provided for illustrative purposes only and must not be construed as restricting the scope of protection of the present invention, unless such sizes and/or values are included in the attached claims.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Some embodiments described with reference to FIGS. from 1 to 4 show an apparatus 10 for bending tubular products 100, preferably straws, even more preferably paper straws, which will be defined in detail below.

Figure 2:
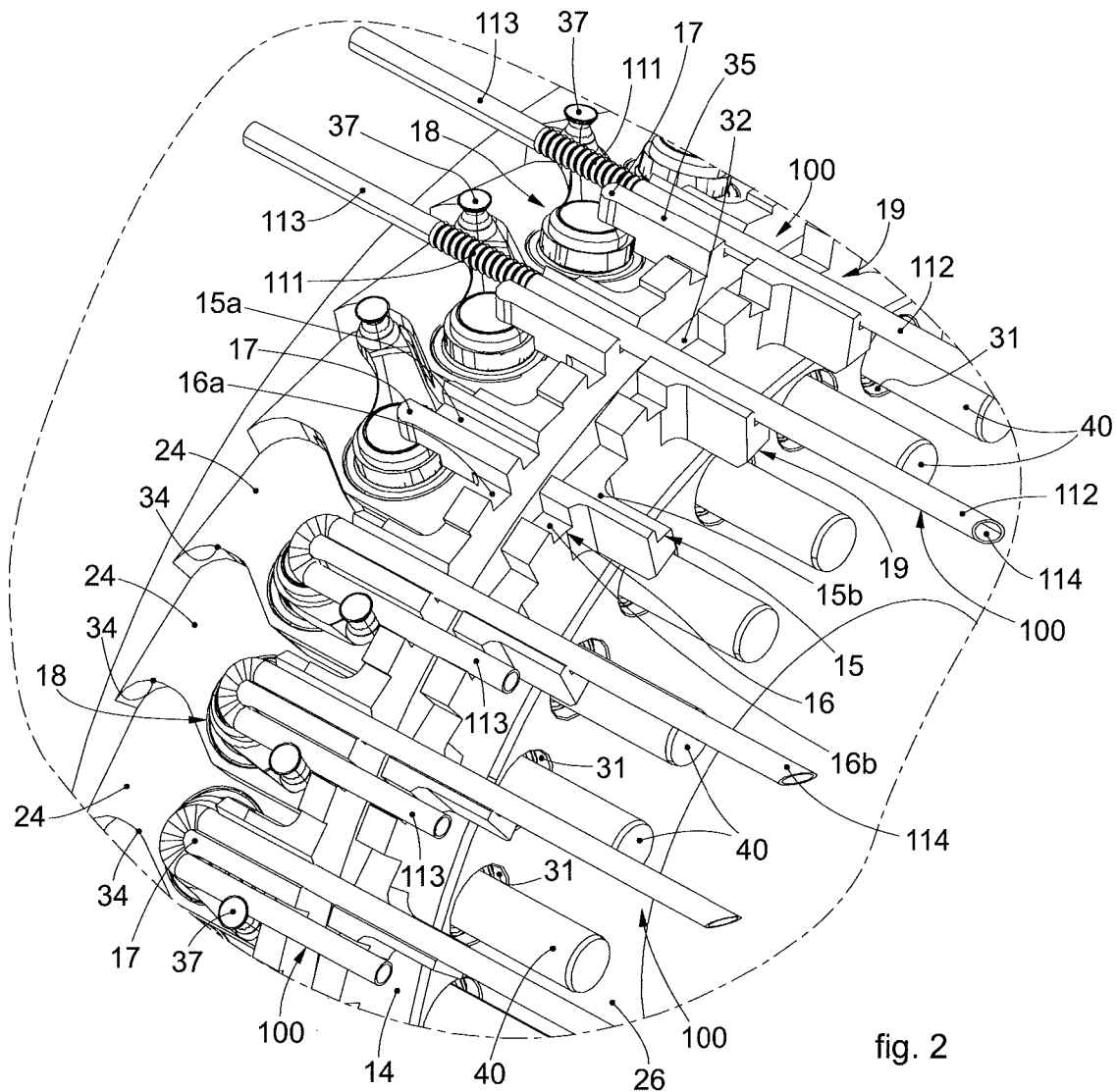
FIG. 2 is an enlarged detail of FIG. 1.

The tubular products 100, better visible in FIG. 2, can each have, for example, the shape of a drinking straw, having a substantially oblong cylindrical shape and having a longitudinal axis of their own.

In the example provided here, the straw 100 has an end 114 which can be advantageously pointed, or cut obliquely, to facilitate its possible insertion into a pierceable zone of a container for beverages.

The straw 100 comprises a flexible portion 111, interposed between two terminal portions 112, 113, one longer than the other. The flexible portion 111 is configured to allow a bending, advantageously of up to about 180°, so that one terminal portion 113 of the straw 100 becomes parallel to the other terminal portion 112 with a greater length of the straw 100 itself, so as to reduce the overall length thereof.

The flexible portion 111 is defined by a succession of annular ridges and throats coaxial with the longitudinal axis of the straw 100.

The straw 100 can be made of paper material, and in particular it can be made by helically winding one or more strip-shaped elements around a forming member.

The straw 100 can also be made of other materials, for example of plastic material or a combination of a plastic material and a paper material, or other.

In one possible application, the apparatus 10 can be inserted in a machine for the automated production of special straws 100 for the food sector of containers for beverages, such as fruit juices, or other. These containers are hermetically closed, are usually small in size, and are provided with a pierceable zone. Evidently, the apparatus 10, as will be better described below, can also function autonomously by receiving at entry straws 100 having a rectilinear development, and supplying at exit straws 100 provided with a bend and ready for packaging.

In accordance with the embodiment shown in FIG. 1, the apparatus 10 comprises a substantially cylindrical support member 11, rotating around its own axis of rotation X and provided with a peripheral surface 12 coaxial with the axis of rotation X, and with two lateral surfaces 25 and 26 (FIG. 1 and FIG. 3) perpendicular to the axis of rotation X.

The apparatus 10 also comprises a circular element 14 in the form of a ring nut, attached on the lateral surface 26 of the support member 11 so as to be coaxial with the axis of rotation X and suitably shaped so as to define positioning means 19 configured to support and temporarily keep the straws 100 in position, as will be described in detail below.

In particular, the circular element 14 is divided into a plurality of angular sectors, for example thirty in number, each one angularly equidistant from the adjacent one, for example by a defined angular pitch, in each of which a straw 100 is suitable to be disposed, so that each straw 100 is parallel to the axis of rotation X.

The positioning means 19 comprise, for each of the angular sectors as above, a first longitudinal groove 15, a second longitudinal groove 16 and a contrast element 17 disposed between the latter.

In particular, the first longitudinal groove 15 is configured to support the longer terminal portion 112 of the straw 100 while the second longitudinal groove 16 is configured to support the shorter terminal portion 113 of the straw 100, when the latter is bent around the contrast element 17.

The apparatus 10 also comprises bending means 18 attached on the peripheral surface 12 so that each one is configured to carry out a bending of a respective straw 100, preferably in correspondence with the flexible portion 111.

In the example described here, the peripheral surface 12 is advantageously divided into a plurality of support portions 24, better visible in FIG. 2, for example thirty in number, each one angularly equidistant from the adjacent one, for example by the same angular pitch characteristic of the angular sectors as above, on each of which a bending mean 18 is suitable to be attached so that it can cooperate with a respective contrast element 17 in order to bend the straw 100.

The bending means 18 comprise, for each support portion 24, a central body 36 and a bending lever 20 rotatably associated with the central body 36 in order to carry out the bending of the straw 100.

The movement of the bending levers 20 is made possible by drive members 22, associated with the support member 11 and mobile with respect thereto, which can comprise known movement mechanisms, for example a cam mechanism and a rack mechanism (FIG. 3).

In the example described here, the support portions 24 are made hollowed in the body of the support member 11 and are reciprocally inclined to define a so-called sawtooth-like perimeter profile, known to the people of skill in the art.

In particular, the support portions 24 can lie on planes inclined with respect to the peripheral surface 12 so as to define support surfaces alternatively disposed at different radial heights, thus configuring a stepped perimeter profile.

Advantageously, the support portions 24 are substantially flat so as to simplify the operating trajectories of the bending levers 20 of the bending means 18.

The support portions 24 can have an extension in the direction of the axis of rotation X at least such as to allow the positioning thereon and the functioning of the bending means 18 without causing reciprocal interference between the mobile and/or fixed parts.

For this purpose, each support portion 24 can have a shaped recess 34, FIG. 2, defined in such a way as to allow a greater angular excursion of the bending levers 20.

Each support portion 24 comprises a seating 13, FIG. 3, having a substantially radial development and inside which the central body 36 of a respective bending mean 18 is housed, as will be described in more detail below.

The support member 11 is provided with a plurality of movement channels 31 (FIGS. 2-3) which extend axially from the lateral surface 26 toward a housing cavity 27 (FIG. 3) defined inside the support member 11.

The movement channels 31 develop at a lower radial height than that of the peripheral surface 12, and each communicates with at least one respective seating 13 disposed above.

In particular, the housing cavity 27 and the movement channels 31 are able to house the drive members 22 of the bending means 18, as will be better described below.

In the embodiment described here, the second longitudinal groove 16 is substantially parallel to the first longitudinal groove 15 so as to allow a reciprocal positioning of the terminal portions 112, 113 of the straw 100, one parallel to the other, in the event a bend of about 180° is to be made (FIG. 2).

In this case, the first longitudinal groove 15 and the second longitudinal groove 16 are disposed substantially parallel to the axis of rotation X.

If, on the other hand, the production of a bend that differs from an angle of about 180° is required, it is possible to provide a different reciprocal inclination of the second longitudinal groove 16 with respect to the first longitudinal groove 15.

In any case, the first longitudinal groove 15 and the second longitudinal groove 16 are disposed at least partly cantilevered above the peripheral surface 12, at a radial height greater than that of the latter.

The first longitudinal groove 15 and the second longitudinal groove 16 can each be interrupted by a circumferential space 32 (FIG. 2 and FIG. 4), also comprised in the circular element 14, so that each housing groove 15 and 16 is divided into two or more separate and contiguous parts.

Figure 4:
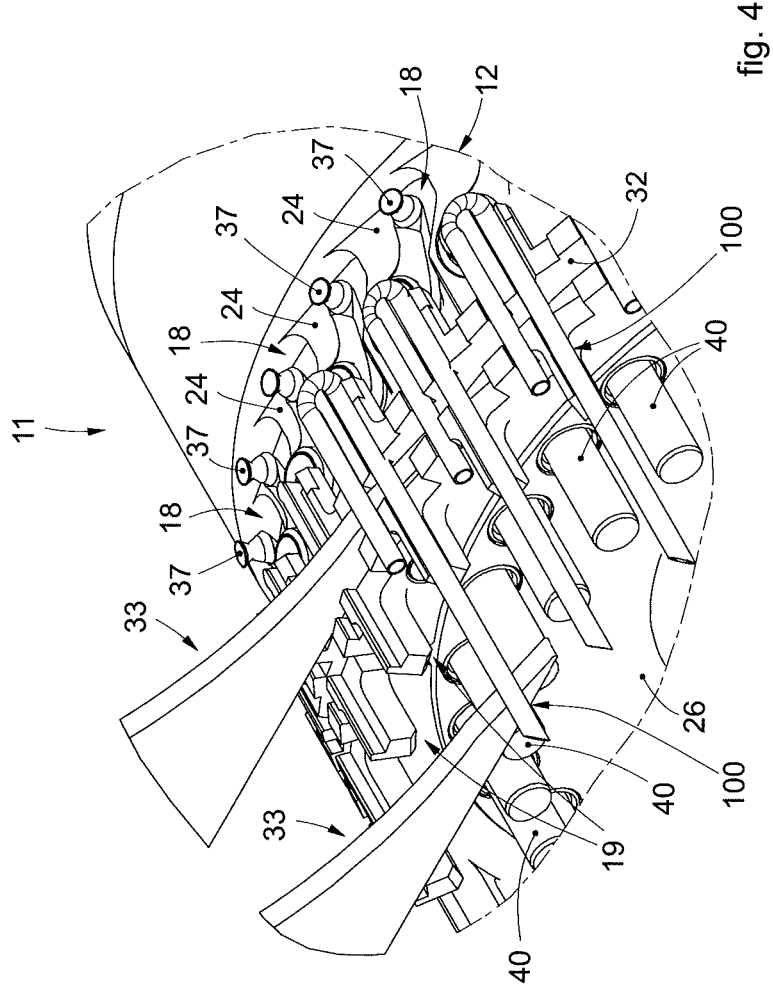
FIG. 4 shows an enlarged detail of FIG. 1 in which means for extracting the straws are shown.

The circumferential space 32 extends along the lateral surface of the circular element 14 and is configured to allow the insertion of extraction means 33, which are configured to allow the disengagement of each straw 100 at the time of its delivery (FIG. 4).

The presence of the circumferential space 32 divides the first longitudinal groove 15 into two first rest portions 15a, 15b, and the second longitudinal groove 16 into two second rest portions 16a, 16b (FIG. 2).

Between the first longitudinal groove 15 and the second longitudinal groove 16 there is disposed a central wall 35, on one terminal end of which there is the contrast element 17.

The contrast element 17 can have a rounded shape such as to determine a suitable bending radius of the flexible portion 111 of the straw 100. In particular, the center of the bending radius of the contrast element 17 is aligned with the center of rotation of the bending lever 20 of the respective bending mean 18.

The central wall 35 also has a discontinuity in correspondence with the circumferential space 32, and delimits the first longitudinal groove 15 on one side and the second longitudinal groove 16 on the opposite side.

With particular reference to FIG. 2 and FIG. 3, the bending lever 20 of each bending mean 18 is mobile between a disengaged position, in which it is distant from the straw 100, and a position of engagement, in which it goes into contact with the straw 100 in order to determine, during use, the bending of the flexible portion 111 on the respective contrast element 17.

The bending lever 20 is provided with a coupling end 20a associated with the central body 36, and with an opposite bending end 20b (FIG. 3a) configured to engage the straw 100 in order to cause its bending.

The bending end 20b can be equipped with a shaped bending element 37, for example with a flared profile, able to contact the shorter terminal portion 113 of the straw 100. During the bending, the flexible portion 111, which is located between the bending lever 20 and the contrast element 17, is made to adhere to the latter (FIG. 2).

The shaped bending element 37 can be attached to or associated with the bending lever 20 in an idle manner, for example in such a way as to limit the friction, caused by sliding, with the body of the straw 100.

With particular reference to FIG. 3a, the central body 36 has a fixed part 36a and a pin 36b, disposed centrally, with which the coupling end 20a of the bending lever 20 is associated.

The fixed part 36a is integral with the support member 11 while the pin 36b is rotatable inside the fixed part 36a, along an axis of rotation substantially orthogonal to the respective support portion 24 on which the central body 36 is installed.

The pin 36b has a notched terminal portion 38 which is disposed, at least partly, in communication with at least one movement channel 31, in such a position as to cooperate with the drive members 22.

The drive members 22 are configured to drive the bending levers 20 of the bending means 18 in order to determine their passage from the disengaged position to the position of engagement, and vice versa (FIGS. 2-3).

The drive members 22 described here comprise, by way of example, a cam mechanism and a rack mechanism. Evidently, it is possible to produce, or use, other known mechanisms for transmitting motion to the bending levers 20.

In the example embodiment described here, the drive members 22 comprise a plurality of rods 40, slidably inserted into respective movement channels 31 of the support member 11, and a shaped body 39, disposed inside the housing cavity 27 of the support member 11 and provided with a shaped peripheral surface on which the rods 40 are slidable so as to transform their rotary motion, along the peripheral shaped surface as above, into an alternating motion, in respective directions parallel to the axis of rotation X, inside the movement channels 31.

The shaped body 39 has a substantially cylindrical shape and is fixed with respect to the support member 11, which can instead rotate around the axis of rotation X thanks to a rotation shaft 28 (FIG. 3). When the support member 11 is rotated, it also drags the rods 40 with it, which can then slide on the shaped peripheral surface of the shaped body 39, always remaining parallel to the axis of rotation X and, as a whole, inside the movement channels 31.

Each rod 40 has a mobile end 41 configured to slide on the shaped peripheral surface of the shaped body 39 following a peripheral-axial curved trajectory.

Here and hereafter in the description, by peripheral-axial curved trajectory we intend to define the motion of a point on the peripheral surface of a cylinder which has both a circumferential component and also an axial component.

The peripheral-axial curved trajectory provides a bending segment 43a and a disengagement segment 43b, wherein the bending segment 43a is disposed further away from the second lateral surface 26 than the disengagement segment 43b. In this way, when the mobile end 41 of the rod 40 slides along the peripheral-axial curved trajectory passing from the disengagement segment 43b to the bending segment 43a, the rod 40 moves away from the lateral surface 26 in order to make the pin 36b rotate in a sense such as to move the bending lever 20 from the disengaged position to the position of engagement.

This peripheral-axial curved trajectory therefore allows the rod 40 to slide inside the respective movement channel 31 with an alternating movement, suitably provided to allow the rotation of the pin 36b in order to drive the bending lever 20 from the disengaged position to the position of engagement and vice versa.

Each rod 40 is axially delimited by the mobile end 41 and by an opposite free end which can protrude from the lateral surface 26 of the support member 11, for example when the bending levers 20 are in the disengaged position.

Each rod 40 has a toothed intermediate portion 44 configured to couple with the notched terminal portion 38 of the pin 36b to determine its rotation (FIGS. 3-3a). This coupling defines a so-called "rack" mechanism, in which the translational movement of the rod 40 is transformed into a rotary movement of the pin 36b.

The mobile end 41 of each rod 40 can be advantageously equipped with rolling means 42. Solely by way of a non-limiting example, the rolling means 42 can be wheels, spheres, or any element whatsoever that allows a relative rolling.

The shaped body 39 is provided with a sliding groove 43 peripherally defined on the lateral surface of the shaped body 39. The sliding groove 43 is hollowed in the shaped body 39 and has the profile of the peripheral-axial curved trajectory as above.

The apparatus 10 also comprises extraction means 33 disposed in a fixed position with respect to the support member 11, and peripherally with respect thereto, in correspondence with the angular position of delivery of the straws 100 (FIG. 4).

The extraction means 33 are configured to allow the disengagement of the straws 100 from the first longitudinal grooves 15 and second longitudinal grooves 16 in which they are positioned (FIG. 4).

In the example embodiment described here, the extraction means are configured as a pair of prongs 33, a first of which is configured to cooperate with the circumferential space 32, so as to lift both the longer terminal portion 112 of the straw 100 and also the shorter terminal portion 113 of the straw 100 to be delivered. A second prong 33 is axially distanced from the first prong 33 so as to allow only the lifting of the longer terminal portion 112 of the straw 100, advantageously in correspondence with a zone bordering the lower end 114 of the straw 100 (FIG. 4).

In particular, when the support member 11 is brought into rotation, there is determined a movement of disengagement and lifting of the straws 100 that are released, for example one at a time, from the first and second longitudinal grooves 15, 16.

The functioning of the apparatus 10 described heretofore, which also corresponds to the method for the automated bending of tubular products 100, preferably made of paper, according to the present invention, is as follows. The method provides that the following steps are carried out, preferably continuously:
- a supply step, in which the positioning means 19 associated with the support member 11 receive and at least temporarily hold one or more tubular elements 100 in a determinate position with respect to the support member 11,
- a bending step, in which the bending means 18 each carry out at least one bending of a respective one of said tubular elements 100, preferably in correspondence with a flexible portion 111 of said tubular product 100,
- a delivery step, in which said bent tubular elements 100 are released from the positioning means 19 in order to be delivered outside the support member 11.

In particular, the support member 11, during its rotation around the axis of rotation X, receives from an entry device (not shown), in correspondence with an angular supply position, one or more straws 100 already shaped and brought to size, possibly also with the lower ends 114 pointed, and delivers, in correspondence with an angular delivery position, the bent straws 100 to an exit device (not shown).

Between the angular supply position and the angular pick-up position there is provided an angular end of bending position in correspondence with which the bending of the straws 100 is substantially finished.

During the rotation movement of the support member 11, around the axis of rotation X, it also brings the rods 40 of the drive members 22 into rotation with it.

The mobile ends 41 of the rods 40 slide, therefore, in the sliding groove 43 of the shaped body 39 which is fixed with respect to the support member 11.

The motion of the mobile ends 41, which follow the peripheral-axial curved trajectory, causes a translation of the respective rods 40 in respective directions parallel to the axis of rotation X, inside the respective movement channels 31. During this translation, the toothed intermediate portions 44 of the rods 40, which are coupled to the respective pins 36b in correspondence with respective notched terminal portions 38, determine the appropriate and desired rotation of the latter, and therefore of the bending levers 20.

At the end of the bending step, the straws 100 are stably positioned in the first and second longitudinal grooves 15, 16 and the support member 11, by rotating around the axis of rotation X, takes them to the angular delivery position in correspondence with which the extraction means 33 release the straws 100 from the first and second longitudinal grooves 15, 16 in order to deliver them to the exit device (not shown).

It is clear that modifications and/or additions of parts and/or steps may be made to the bending apparatus 10 and to the corresponding method as described heretofore, without departing from the field and scope of the present invention as defined by the claims.

It is also clear that, although the present invention has been described with reference to some specific examples, a person of skill in the art shall certainly be able to achieve many other equivalent forms of apparatuses and methods for bending tubular products, preferably straws, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Apparatus for bending tubular products, said apparatus comprising:
   at least a support member configured to support, at least temporarily, a plurality of tubular products;
   a plurality of retaining elements, each retaining element of said plurality of retaining elements being configured to retain a respective tubular product in a determinate position with respect to said support member, and a corresponding plurality of contrast elements associated with said support member; and
   a plurality of bending element associated with said support member and configured to cooperate with said plurality of contrast elements to carry out a bending of said tubular products around said plurality of contrast elements, wherein said support member has a cylindrical shape which is configured to rotates around an axis of rotation and is provided with a peripheral surface with said plurality of contrast elements mounted thereon.

2. Apparatus as in claim 1, wherein said retaining elements comprise a plurality of longitudinal grooves parallel to each other and configured to accommodate said plurality of tubular products.

3. Apparatus as in claim 2, wherein each of said longitudinal grooves is configured to support a first terminal portion of a respective tubular product.

4. Apparatus as in claim 2, wherein it also comprises a circular element, coaxial with said axis of rotation and attached on a lateral surface of said support member, and in that said circular element is divided into a plurality of angular sectors each one angularly equidistant from the adjacent one, on each of which said plurality of longitudinal grooves are made.

5. Apparatus as in claim 2, wherein each of said longitudinal grooves extends along a longitudinal direction parallel to said axis of rotation.

6. Apparatus as in claim 1, wherein each bending element of said plurality of bending elements comprises a bending lever rotatably mounted on said peripheral surface of the support member and configured to carry out the bending of a respective one of said tubular products around a respective contrast element of said plurality of contrast elements.

7. Apparatus as in claim 6, wherein said bending element is provided with a pin with which said bending lever is rotatably associated.

8. Apparatus as in claim 6, wherein it also comprises drive members configured to cause a rotation of said bending elements, and wherein said drive members comprise at least one of either a cam mechanism or a rack mechanism for moving said bending levers.

9. Apparatus as in claim 8, wherein each drive member comprises a rod, slidably inserted into a respective channel of the support member.

10. Apparatus as in claim 9, wherein each rod has a toothed portion coupled with a corresponding notched portion of the bending lever, and wherein a translational movement of the rod is transformed into a rotary movement of the bending lever.

11. Apparatus as in claim 6, wherein said bending lever is mobile around said contrast element between a resting position and a bending position, in which said bending lever contacts said tubular product and bends it against said contrast element.

12. Apparatus as in claim 1, wherein said peripheral surface is divided into a plurality of support portions each one angularly equidistant from the adjacent one and reciprocally inclined to define a sawtooth-like perimeter profile, and in that one of said bending elements is attached on each of said support portions.

13. Apparatus as in claim 1, wherein it also comprises extraction elements disposed in a fixed position with respect to said support member and peripherally with respect to said support member, in correspondence with an angular position of delivery of said tubular products, wherein said extraction elements are configured to allow the disengagement of said tubular products from the respective retaining elements.

14. Apparatus as in claim 1, wherein each of said plurality of contrast elements extends along a longitudinal direction parallel to said axis of rotation.

15. Apparatus as in claim 1, wherein said retaining elements are configured to retain a respective tubular product along a longitudinal direction parallel to said axis of rotation.

16. Method to bend tubular products, said method comprising at least the following steps:

supplying a plurality of tubular elements to a respective plurality of retaining elements associated with a support member, each retaining element of said plurality of retaining elements retaining a respective tubular product in a determinate position with respect to said support member, bending said plurality of tubular product around a plurality of contrast elements by means of a plurality of bending elements associated with said support member, wherein said support member has a cylindrical shape which rotates around an axis of rotation and is provided with a peripheral surface with said plurality of contrast elements mounted thereon.

17. Method as in claim 16, wherein during said supplying step, bending step and delivery step, said support member continuously-rotates around said axis of rotation.

18. Method as in claim 16, wherein each of said tubular products are provided with a respective flexible portion and said bending is made on said flexible portions.

19. Method as in claim 16, wherein each of said plurality of tubular products is retained parallel to said axis of rotation during the bending.

* * * * *